United States Patent
Uehara et al.

(10) Patent No.: US 9,879,590 B2
(45) Date of Patent: Jan. 30, 2018

(54) DIRECT INJECTION DIESEL ENGINE

(71) Applicant: NISSAN MOTOR CO., LTD., Yokohama-shi, Kanagawa (JP)

(72) Inventors: Isshou Uehara, Isehara (JP); Manabu Hasegawa, Yokohama (JP); Naohide Tsuji, Hiratsuka (JP); Masahiko Nakano, Tokyo (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 3 days.

(21) Appl. No.: 14/889,520

(22) PCT Filed: Jan. 21, 2014

(86) PCT No.: PCT/JP2014/051095
§ 371 (c)(1),
(2) Date: Nov. 6, 2015

(87) PCT Pub. No.: WO2014/188736
PCT Pub. Date: Nov. 27, 2014

(65) Prior Publication Data
US 2016/0084148 A1    Mar. 24, 2016

(30) Foreign Application Priority Data

May 20, 2013 (JP) ................................. 2013-105737

(51) Int. Cl.
F02B 23/06 (2006.01)
F02M 61/18 (2006.01)
F02P 19/02 (2006.01)

(52) U.S. Cl.
CPC ...... *F02B 23/0648* (2013.01); *F02B 23/0669* (2013.01); *F02B 23/0672* (2013.01);
(Continued)

(58) Field of Classification Search
None
See application file for complete search history.

(56) References Cited

U.S. PATENT DOCUMENTS 4,635,597 A * 1/1987 Ohashi ............... F02B 23/0651
123/263

FOREIGN PATENT DOCUMENTS

EP    1 469 193 A1    10/2004
JP    S54-106419 U    7/1979
(Continued)

*Primary Examiner* — Joseph Dallo
*Assistant Examiner* — Kurt Liethen
(74) *Attorney, Agent, or Firm* — Drinker Biddle & Reath LLP

(57) ABSTRACT

A fuel injection nozzle disposed in a center of a reentrant cavity combustion chamber has first and second nozzle hole groups whose inclination angles with respect to a cylinder center axis line are different. A nozzle hole diameter of the second nozzle hole group is larger than that of the first one. First and second nozzle holes are alternately arranged in a circumferential direction. A glow plug projects, in a height direction of the cylinder, up to a height of a spray center axis line (F2) of the second nozzle hole directed at a lower side. Therefore the glow plug can contact fuel masses formed by sprays from both the first and second nozzle holes. The glow plug is positioned between spray center axis lines (F1, F2) in the circumferential direction, and positioned at a swirl downstream side of spray center axis line (F2).

6 Claims, 5 Drawing Sheets

(52) U.S. Cl.
CPC ..... *F02B 23/0696* (2013.01); *F02M 61/1813* (2013.01); *F02M 61/1846* (2013.01); *F02P 19/02* (2013.01); *Y02T 10/125* (2013.01)

(56) References Cited

FOREIGN PATENT DOCUMENTS

| | | |
|---|---|---|
| JP | H06-74131 A | 3/1994 |
| JP | H09-21321 A | 1/1997 |
| JP | 2000-002116 A | 1/2000 |
| JP | 2000-002116 A | 1/2000 |
| JP | 2002-364366 A | 12/2002 |
| JP | 2005-120832 A | 5/2005 |
| JP | 2005-120832 A | 5/2005 |
| JP | 2010-071094 A | 4/2010 |
| WO | WO 2012/080331 A2 | 6/2012 |

\* cited by examiner

DIRECT INJECTION DIESEL ENGINE

TECHNICAL FIELD

The present invention relates to improvement of a direct injection diesel engine in which a cavity combustion chamber is formed in a middle portion of a top surface of a piston and a fuel injection nozzle having a plurality of nozzle holes is disposed at a substantially center position of the cavity combustion chamber.

BACKGROUND OF THE INVENTION

In recent years, improvement in fuel economy of a direct injection diesel engine has taken place by reducing a cooling loss by relatively reducing a gas flow in a cylinder. However, soot tends to increase due to poor mixing caused by small gas flow.

To deal with such a problem, a Patent Document 1 discloses a direct injection diesel engine using a fuel injection nozzle having two nozzle hole groups whose inclination angles with respect to a cylinder center axis line are different from each other, one is a large inclination angle and the other is a small inclination angle. Here, as compared with a penetration force of one of the two nozzle hole groups which is directed at an upper side, a penetration force of the other of the two nozzle hole groups which is directed at a lower side is set to be large. Further, these two types of nozzle holes are alternately arranged in a circumferential direction. With these setting and arrangement, fuel can be widely spread in a combustion chamber and the soot can be reduced.

In addition, also in a Patent Document 2 that concerns a methanol engine using methanol as fuel which is not capable of being compression-ignited, a fuel injection nozzle having two nozzle hole groups whose inclination angles with respect to a cylinder center axis line are different from each other, one is a large inclination angle and the other is a small inclination angle, is used. Then, a glow plug to ignite the methanol fuel is provided at a position crossing a spray center axis line of one nozzle hole of the nozzle hole group that is directed at an upper side.

In the case of the direct injection diesel engine performing the compression ignition, although a glow plug or an intake heater alternative to the glow plug is required for a cold start, there is no disclosure about an arrangement of the glow plug in the Patent Document 1.

On the other hand, the Patent Document 2 has a configuration in which fuel that is injected from the nozzle hole directly collides with the glow plug. In this configuration, there is a problem that durability of the glow plug becomes low. In addition, in the direct injection diesel engine, especially when performing the cold start requiring the glow plug, it is general that the cold start is performed in combination with a swirl in the combustion chamber. However, a following fuel mass which flows and comes along the swirl in the presence of the swirl is positioned at a relatively lower side in a height direction of a cylinder. Therefore, if the glow plug is arranged at a position corresponding to the upper side spray center axis line like the Patent Document 2, the glow plug cannot contact the following fuel mass. Accordingly, ignitibility in the presence of the swirl becomes low.

PRIOR ART REFERENCES

Patent Publications

Patent Document 1: Japanese Patent Application Publication JP2005-120832

Patent Document 2: Japanese Patent Application Publication JP6-74131

SUMMARY OF THE INVENTION

A direct injection diesel engine of the present invention in which a swirl is produced in a cylinder, comprises: a cavity combustion chamber formed in a middle of a top surface of a piston; a fuel injection nozzle having a plurality of nozzle holes, the fuel injection nozzle disposed at a substantially center position of the cavity combustion chamber; and a glow plug projecting from a ceiling surface of the cavity combustion chamber so that a tip end portion of the glow plug is positioned in the cavity combustion chamber at a piston top dead center position, and the fuel injection nozzle having a first nozzle hole group and a second nozzle hole group whose inclination angles with respect to a cylinder center axis line are different from each other, a plurality of first nozzle holes belonging to the first nozzle hole group being arranged so that a spray center axis line of each of the first nozzle holes is a radial shape, a plurality of second nozzle holes belonging to the second nozzle hole group being arranged so that a spray center axis line of each of the second nozzle holes is a radial shape, and the first and second nozzle holes being alternately arranged in a circumferential direction, and the glow plug being positioned between the spray center axis line of the first nozzle hole and the spray center axis line of the second nozzle hole in the circumferential direction, and projecting, in a height direction of the cylinder, up to a height of one of the spray center axis lines which is directed at a relatively lower side.

With this configuration, a spray that is injected from each of the nozzle holes does not directly collide with the glow plug. After the spray is injected, a fuel mass spread to a swirl downstream side by the swirl contacts the glow plug. At this time, positions in a height direction in the cylinder of the spray injected from the first nozzle hole and the spray injected form the second nozzle hole are different. However, the glow plug projects so as to be sufficiently long and be able to receive both of the sprays. Therefore, after the fuel mass by the spray from either one of the first nozzle hole group or the second nozzle hole group contacts the glow plug, the following fuel mass by the spray from the other nozzle hole group, which flows and comes to the glow plug by the swirl, certainly contacts the glow plug. Thus, ignition at the time of a cold start can be certainly obtained.

As a preferable embodiment of the present invention, in a case where a nozzle hole diameter of one of the nozzle hole groups is larger than a nozzle hole diameter of the other nozzle hole group, it is preferable that the glow plug is positioned at the swirl downstream side, in the circumferential direction, of the spray center axis line of a nozzle hole having the relatively large nozzle hole diameter.

That is, since the nozzle hole diameter is different as mentioned above, a relatively large amount of the fuel is injected from the nozzle hole having the large nozzle hole diameter. In the above configuration, after the fuel is injected, first a fuel mass having the large amount of the fuel from the nozzle hole having the large nozzle hole diameter contacts the glow plug by the swirl. Next, a fuel mass by the spray from a nozzle hole having a small nozzle hole diameter contacts the glow plug. Therefore, it is advantageous to ignitibility.

According to the present invention, in a configuration of the direct injection diesel engine in which the first nozzle hole and second nozzle hole whose inclination angles with respect to the cylinder center axis line are different, one is a large inclination angle and the other is a small inclination angle, are alternately arranged in the circumferential direction, it is possible to improve the ignitibility at the time of the cold start while ensuring durability of the glow plug.

MODE FOR IMPLEMENTING THE INVENTION

In the following, embodiments of the present invention will be explained in detail with reference to the drawings.

Figure 1:
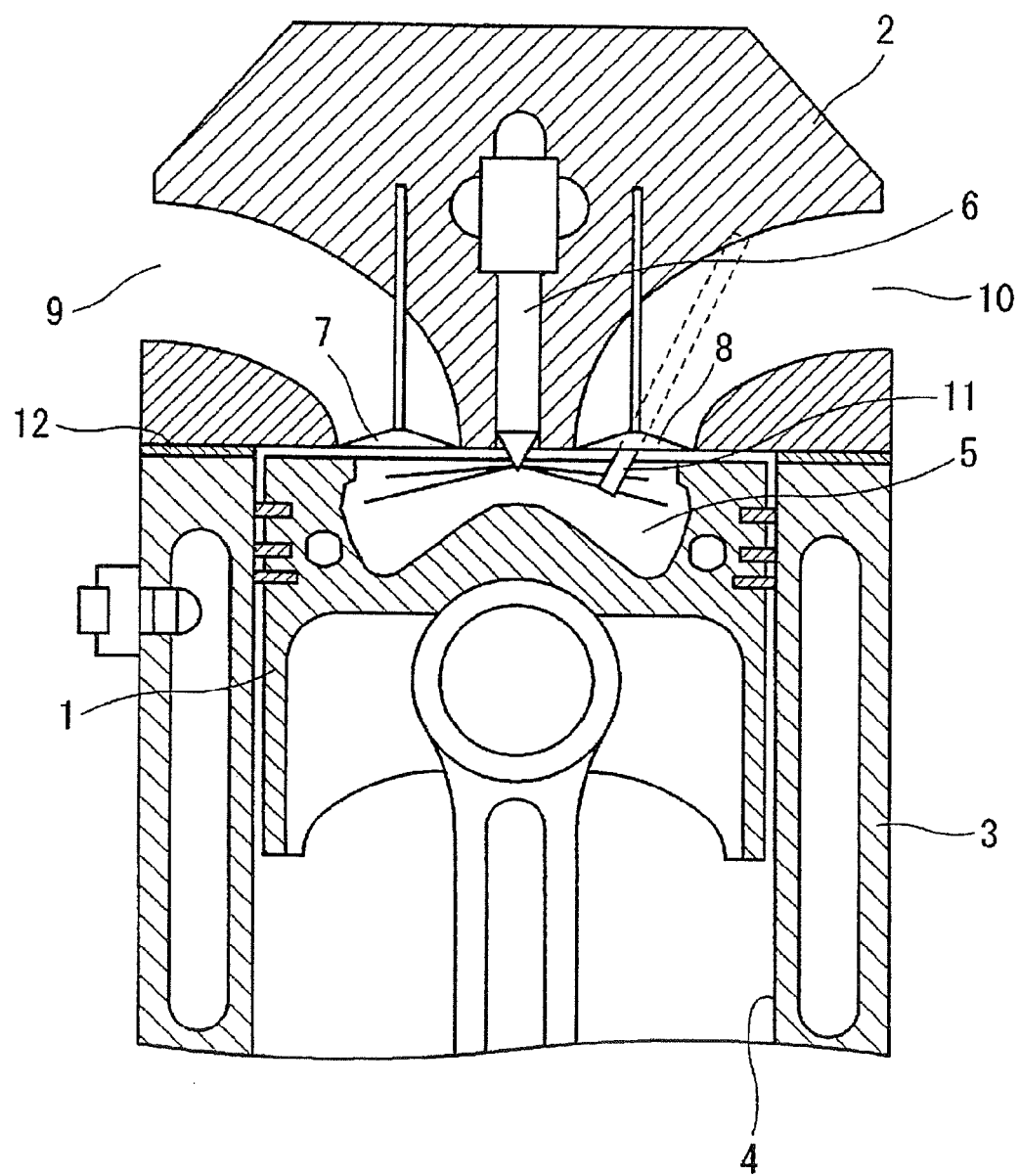
FIG. 1 is a sectional view showing an embodiment of a direct injection diesel engine according to the present invention.

FIG. 1 is a sectional view showing a main part of a direct injection diesel engine according to the present invention. A piston 1 is slidably fitted into a cylinder 4 that is formed at a cylinder block 3. A cylinder head 2 is mounted and fixed on an upper surface of this cylinder block 3. A lower surface of the cylinder head 2 is formed flat and covers an upper end opening of the cylinder 4.

A reentrant type of a recessed cavity combustion chamber 5 is formed on a top surface of the piston 1. This cavity combustion chamber 5 has a rotational body shape with a piston center axis line being a center. That is, the cavity combustion chamber 5 is a perfect circle in a plane view of piston 1 and is formed in a middle of the piston 1. In addition, a fuel injection nozzle 6 having a plurality of nozzle holes is disposed at the cylinder head 2 side in a center position of the cylinder 4 corresponding to a center of the cavity combustion chamber 5. In this embodiment, the fuel injection nozzle 6 is disposed along a center axis line of the cylinder 4, namely that the fuel injection nozzle 6 is disposed vertically.

A pair of intake valves 7 and a pair of exhaust valves 8 are provided at the cylinder head 2. The intake valve 7 and the exhaust valve 8 respectively open and close top end opening portions of an intake port 9 and an exhaust port 10. Each valve system of these intake valve 7 and exhaust valve 8 is arranged in a vertical position parallel to the center axis line of the cylinder 4. Here, one of the pair of intake ports 9 which are opened and closed by the pair of intake valves 7 is formed as a helical port, and the other is formed as a straight port. By closing a swirl control valve (not shown) that is disposed at the straight port side, intensity of the swirl, which is produced in an arrow S direction (see FIG. 3 and FIG. 5) in cylinder 4, is variably controlled. Here, even if the swirl control valve is not operated (the swirl control valve is in an open state), the swirl in the arrow S direction is produced by a shape of the intake port 9 formed from the helical port.

Further, the cylinder head 2 is provided with a rodlike glow plug 11 that projects from a lower surface of the cylinder head 2 (from a ceiling surface of the combustion chamber) so that a tip end portion of the glow plug 11 is positioned in the cavity combustion chamber 5 at a piston top dead center position.

Figure 2:
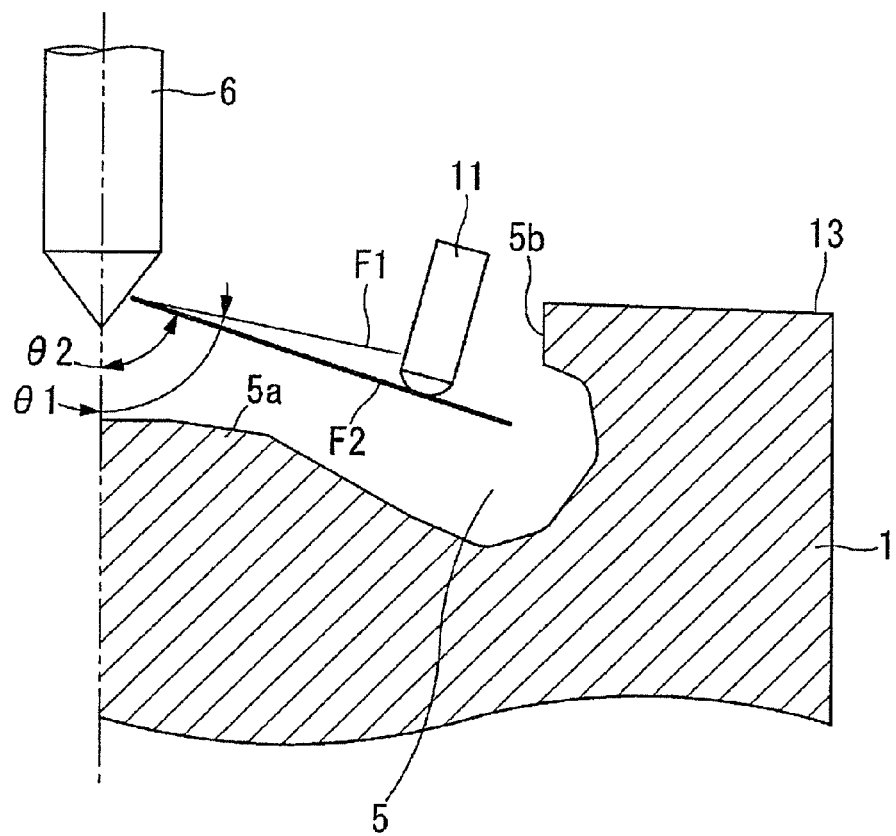
FIG. 2 is a sectional view showing a main part of a combustion chamber of the embodiment.

FIG. 2 shows a more specific sectional view of the cavity combustion chamber 5. This cavity combustion chamber 5 has, as a reentrant shape, a mountain-shaped central bulging portion 5a at a middle of a bottom surface of the cavity combustion chamber 5. A diameter of a lip portion 5b of an entrance part of the cavity combustion chamber 5 is relatively small as compared with a maximum diameter at an almost middle position in a height direction of the cavity combustion chamber 5. An annular piston top surface 13 around the cavity combustion chamber 5 is present along a plane surface that is perpendicular to the piston center axis line. In addition, the piston top surface 13 is substantially the same surface as the upper surface of the cylinder block 3 in the piston top dead center position. Therefore, in the piston top dead center position, a gap corresponding to a thickness of a cylinder head gasket 12 (see FIG. 1) exists as a squish area between the piston top surface 13 and the lower surface of cylinder head 2 (the ceiling surface of the combustion chamber). In addition, relatively shallow valve recesses are formed in positions corresponding to valve head portions of the intake valve 7 and the exhaust valve 8, although these are not shown in the drawing.

The fuel injection nozzle 6 has two nozzle hole groups having a large and a small inclination angles with respect to the cylinder center axis line in the cavity combustion chamber 5. A straight line shown by sign F1 indicates a spray center axis line of a first nozzle hole group. This first nozzle hole group includes a plurality of nozzle holes, for example, 4 to 6 nozzle holes, which are arranged at regular intervals in a circumferential direction. Each of these nozzle holes (in the following, it is written as a first nozzle hole, as necessary) has the same inclination angle $\theta 1$ with respect to the cylinder center axis line. Therefore, a plurality of sprays are formed along a cone having the inclination angle $\theta 1$ with the cylinder center axis line being a center. Here, the spray center axis line F1 of each of the nozzle holes belonging to the first nozzle hole group is directed at a vicinity of a cylindrical surface of the lip portion 5b in the piston top dead center position.

Further, a straight line shown by sign F2 indicates a spray center axis line of a second nozzle hole group. This second nozzle hole group, in the same manner as the first nozzle hole group, has a plurality of nozzle holes, for example, 4 to 6 nozzle holes, which are arranged at regular intervals in the circumferential direction. Each of these nozzle holes (in the following, it is written as a second nozzle hole, as necessary) has the same inclination angle $\theta 2$ with respect to the cylinder center axis line. Therefore, a plurality of sprays are formed along a cone having the inclination angle $\theta 2$ with the cylinder center axis line being a center. Here, the inclination angle $\theta 2$ of the second nozzle hole group is smaller than the inclination angle $\theta 1$ of the first nozzle hole group. Further, in the piston top dead center position, the spray center axis line F2 of each of the nozzle holes belonging to the second nozzle hole group is directed at a lower side position with respect to a lower end of the lip portion 5b (is directed at a position that is lower than the lower end of the lip portion 5b), namely, directed at a portion whose diameter is enlarged as compared with the diameter of the lip portion 5b in the cavity combustion chamber 5.

In a plane view, as mentioned above, each of the nozzle holes of the first nozzle hole group is radially arranged at regular intervals. Likewise, each of the nozzle holes of the second nozzle hole group is also radially arranged at regular intervals. In a relation between them in the plane view, one of the second nozzle holes is arranged between adjacent two nozzle holes, namely that the first nozzle hole and the second nozzle hole are alternately arranged in the circumferential direction.

Moreover, a nozzle hole diameter of the second nozzle hole belonging to the second nozzle hole group is larger than a nozzle hole diameter of the first nozzle hole belonging to the first nozzle hole group. With this, in a condition that a total fuel injection amount (in other words, an engine load) is at least larger than a certain level, a penetration force of each spray by the second nozzle hole group becomes greater than a penetration force of each spray by the first nozzle hole group. In addition, also as an amount of the fuel that is injected from each nozzle hole, the amount of the second nozzle hole is larger than that of the first nozzle hole.

Figure 3:
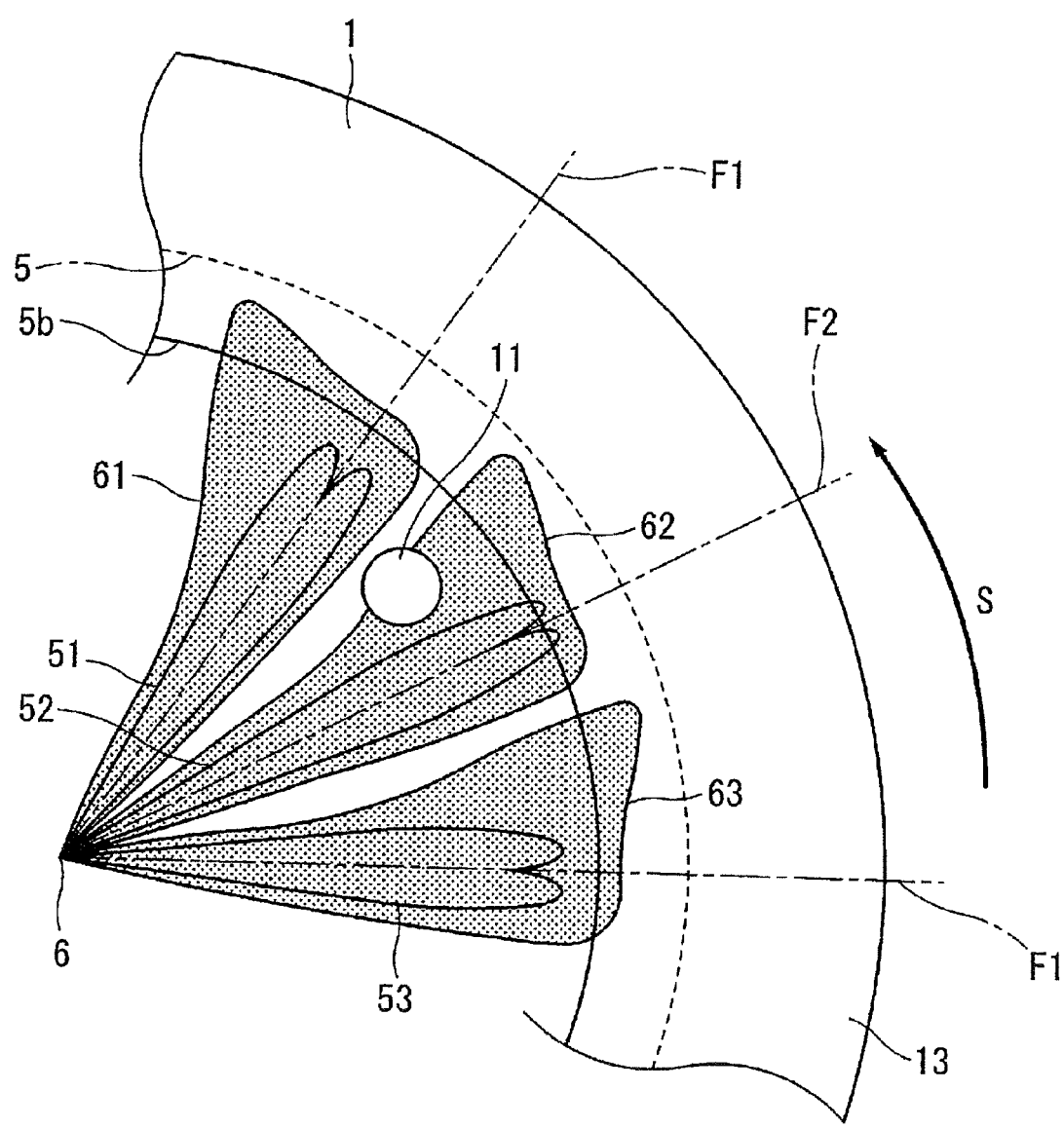
FIG. 3 is an explanatory drawing showing a state of sprays in the combustion chamber.

FIG. 3 is an explanatory drawing showing a state of the sprays that are formed by the first nozzle hole group and the second nozzle hole group in the combustion chamber in a plane view viewed from an upper side of cylinder 4. Signs 51 and 53 each indicate a shape of an early spray that is formed along the spray center axis line F1 by the first nozzle hole that is directed at a relatively upper side. These sprays 51 and 53 spread as shown by sings 61 and 63 and flow to a downstream side by a swirl S with the passage of time. Sign 52 indicates a shape of an early spray that is formed along the spray center axis line F2 by the second nozzle hole that is directed at a relatively lower side. This spray 52 also spreads as shown by sign 62 and flows to the downstream side of the swirl S with the passage of time.

As shown in FIG. 3, with consideration given to each spray formed as above, the glow plug 11 is set in a position located at an outer circumferential side of the entrance part of the cavity combustion chamber 5 in a radial direction. Further, the glow plug 11 is positioned between the spray center axis line F1 of the first nozzle hole and the spray center axis line F2 of the second nozzle hole in the circumferential direction so that the early sprays 51, 52 and 53 do not directly collide with the glow plug 11. In particular, the glow plug 11 is disposed in a position located at a swirl downstream side, in a swirling direction of the swirl S, of the spray center axis line F2 of the second nozzle hole having the relatively large nozzle hole diameter.

In addition, as shown in FIG. 2, the glow plug 11 projects, in a height direction of the cylinder 4, up to a height of the spray center axis line F2 of the second nozzle hole group directed at the relatively lower side position.

In the above-mentioned configuration, fuel sprays that are injected with a predetermined injection timing before a compression top dead center reach the piston 1 when the piston 1 is around the top dead center. Here, as shown in FIG. 3, the fuel spray injected from each nozzle hole along the spray center axis lines F1 and F2 is affected by the swirl S existing in the cylinder, and spreads to the downstream side of the swirl S. Since the glow plug 11 supplied with power at the time of the cold start is positioned at the swirl downstream side of the spray center axis line F2 of the second nozzle hole, the fuel mass 62 formed by the spread of the spray 52 by the second nozzle hole to the swirl downstream side contacts the glow plug 11 first. Then, in consequence of further swirling of the spray to the swirl downstream side, a fuel mass shown by the sing 63 formed by the spread of the spray 53 by the first nozzle hole contacts the glow plug 11 next.

Since the glow plug 11 projects up to the height of the spray center axis line F2 of the second nozzle hole, both fuel masses of the spray of the first nozzle hole and the spray of the second nozzle hole certainly contact the glow plug 11. Therefore, ignitibility at the time of the cold start by the glow plug 11 is improved. In particular, in the embodiment, the glow plug 11 is positioned at the swirl downstream side of the spray 52 injected from the second nozzle hole having the large nozzle hole diameter and the relatively large fuel injection amount. Therefore, a fuel mass having a large fuel amount contacts the glow plug 11 first, thus, ignition can be performed more certainly. Moreover, the early spray does not directly collide with the glow plug 11, thereby suppressing early deterioration of the glow plug 11.

In addition, in the configuration of the embodiment, the fuel widely spreads in the cavity combustion chamber 5 by the first nozzle hole group and the second nozzle hole group whose inclination angles with respect to the cylinder center axis line are different. Therefore, it is possible to effectively use air existing in the entire cavity combustion chamber 5. Furthermore, since the nozzle hole diameter of the second nozzle hole group directed at an inside of the cavity combustion chamber 5 is set to be larger, this has the advantage of supplying an appropriate ratio or proportion of the fuel for a shape of the cavity combustion chamber 5 from each nozzle hole group.

Figure 4:
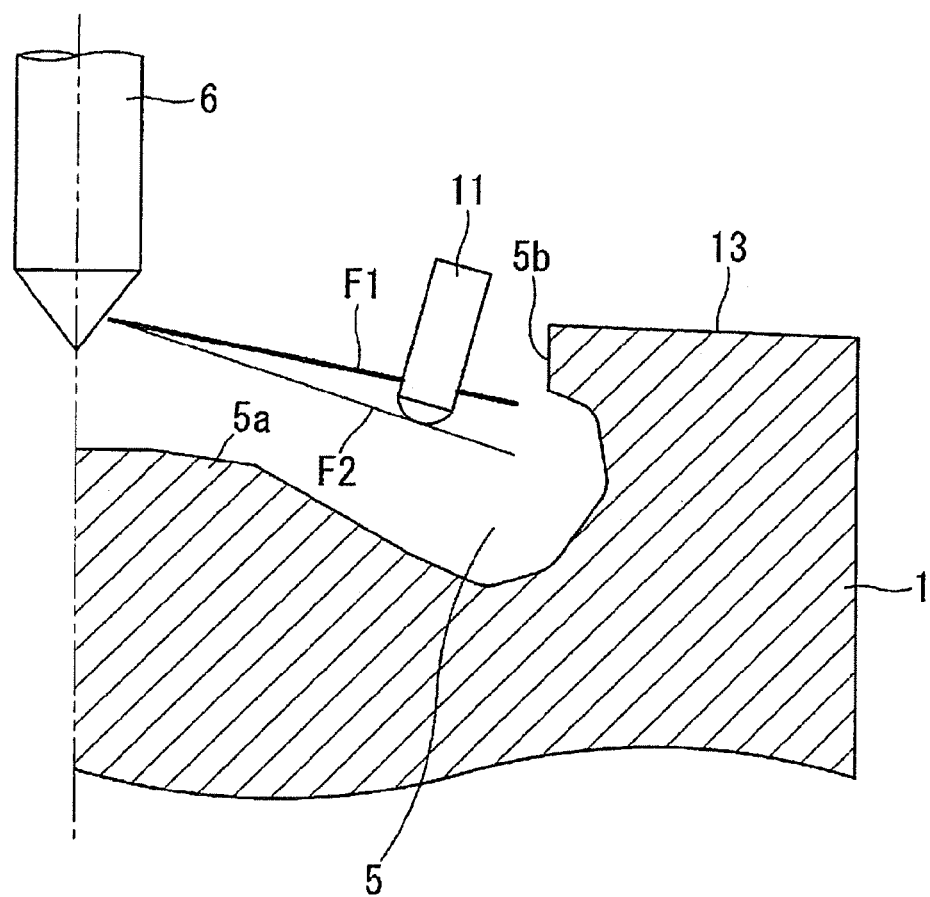
FIG. 4 is a sectional view showing a main part of a second embodiment of the present invention.
Figure 5:
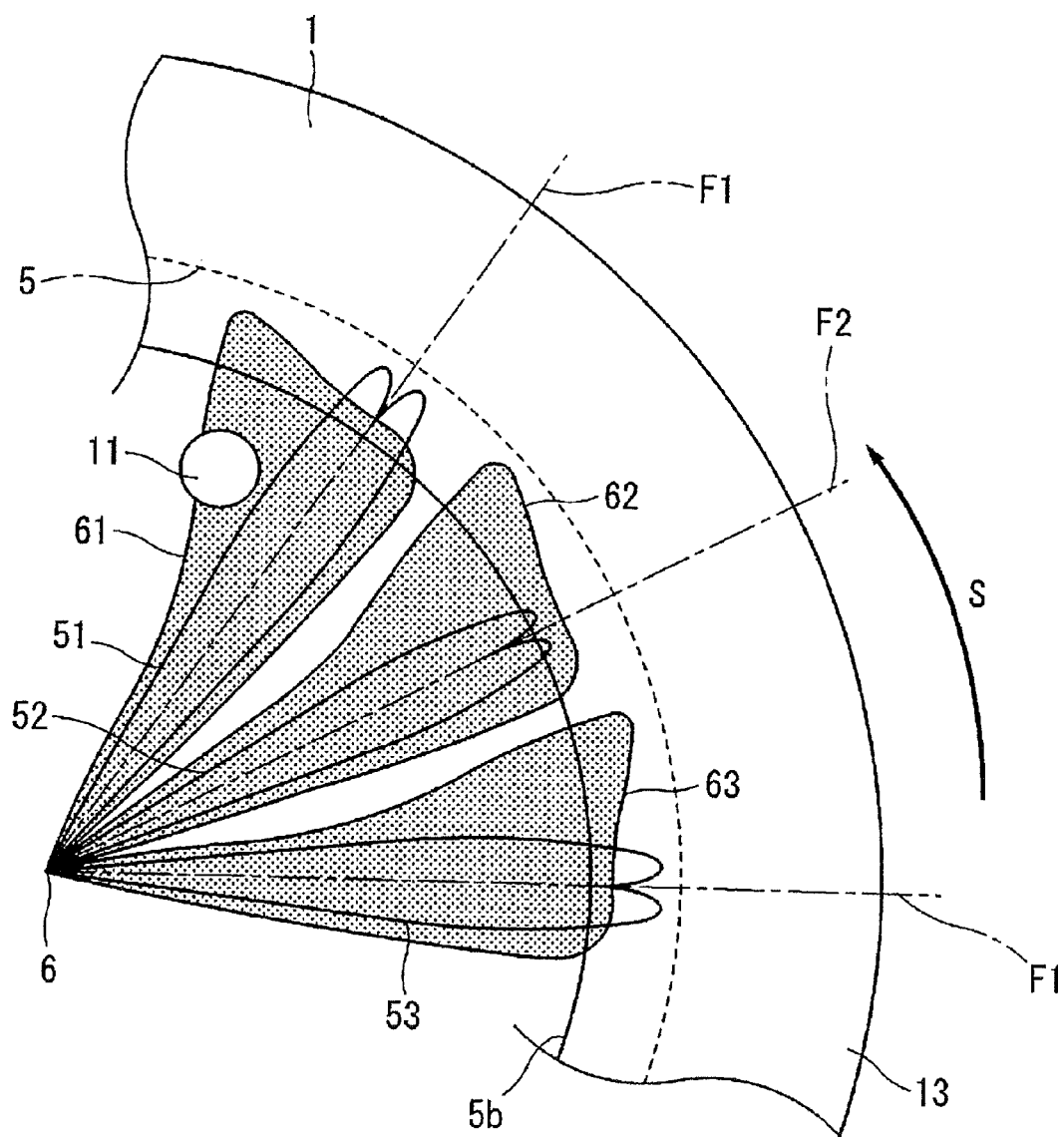
FIG. 5 is an explanatory drawing showing a state of sprays in the combustion chamber in the second embodiment.

Next, FIG. 4 and FIG. 5 show a second embodiment of the present invention. In the same manner as the above embodiment, this second embodiment has the first nozzle hole group whose inclination angle with respect to the cylinder center axis line is large and the second nozzle hole group whose inclination angle with respect to the cylinder center axis line is small. However, unlike the above embodiment, which is opposite to the above embodiment, the nozzle hole diameter of the first nozzle hole directed at the relatively upper side is larger than the nozzle hole diameter of the second nozzle hole directed at the relatively lower side. Therefore, the fuel amount that is injected from the first nozzle hole is relatively larger than the fuel amount that is injected from the second nozzle hole.

In this case, as shown in FIG. 5, the glow plug 11 is disposed at the swirl downstream side of the spray center axis line F1 of the first nozzle hole having the large nozzle hole diameter. Here, regarding the position of the glow plug 11 in the height direction of the cylinder, it is the same as that in the above embodiment, namely that the glow plug 11 projects up to the height of the spray center axis line F2 of the second nozzle hole directed at the relatively lower side. Therefore, in the same manner as the above embodiment, it is possible to gain a high ignitibility while suppressing the deterioration of the glow plug 11.

Although the embodiments of the present invention have been explained above, the present invention is not limited to the embodiments, and can be modified. For example, in each of the embodiments, the nozzle hole diameter of the first nozzle hole group and the nozzle hole diameter of the second nozzle hole group are different. However, the present invention can be applied to a case where the both nozzle hole diameters are equal. In this case, the glow plug 11 can be positioned either at the swirl downstream side of the spray center axis line F1 of the first nozzle hole or at the swirl downstream side of the spray center axis line F2 of the second nozzle hole.

The invention claimed is:

1. A direct injection diesel engine in which a swirl is produced in a cylinder, comprising:
   a cavity combustion chamber formed in a middle of a top surface of a piston;
   a fuel injection nozzle having a plurality of nozzle holes, the fuel injection nozzle disposed at a substantially center position of the cavity combustion chamber; and a glow plug projecting from a ceiling surface of the cavity combustion chamber so that a tip end portion of the glow plug is positioned in the cavity combustion chamber at a piston top dead center position, and the fuel injection nozzle having a first nozzle hole group and a second nozzle hole group whose inclination angles with respect to a cylinder center axis line are different from each other, a plurality of first nozzle holes belonging to the first nozzle hole group being arranged so that a spray center axis line of each of the first nozzle holes is a radial shape, a plurality of second nozzle holes belonging to the second nozzle hole group being arranged so that a spray center axis line of each of the second nozzle holes is a radial shape, and the first and second nozzle holes being alternately arranged in a circumferential direction, and the glow plug being positioned between the spray center axis line of the first nozzle hole and the spray center axis line of the second nozzle hole in the circumferential direction, and projecting, in a height direction of the cylinder, to a height of a lower of the spray center axis line of the first nozzle hole and the spray center axis line of the second nozzle hole.

2. The direct injection diesel engine as claimed in claim 1, wherein:

a nozzle hole diameter of one of the nozzle hole groups is larger than a nozzle hole diameter of the other nozzle hole group, and the glow plug is positioned at a swirl downstream side, in the circumferential direction, of the spray center axis line of the nozzle hole having the relatively large nozzle diameter.

3. The direct injection diesel engine as claimed in claim 2, wherein:

the nozzle hole diameter of the second nozzle hole group which is directed at the relatively lower side position is large as compared with the nozzle hole diameter of the first nozzle hole group which is directed at a relatively upper side position.

4. The direct injection diesel engine as claimed in claim 1, wherein:

the fuel injection nozzle is disposed vertically along the cylinder center axis line.

5. The direct injection diesel engine as claimed in claim 1, wherein:

the cavity combustion chamber is a reentrant type combustion chamber, a diameter of an entrance part of which is relatively small as compared with a maximum diameter at a substantially middle position of which.

6. The direct injection diesel engine as claimed in claim 1, wherein:

the cavity combustion chamber has a rotational body shape with a piston center axis line being a center.

* * * * *